July 7, 1936.  W. C. DEVEREAUX  2,046,612
DOVETAIL
Filed Jan. 28, 1935
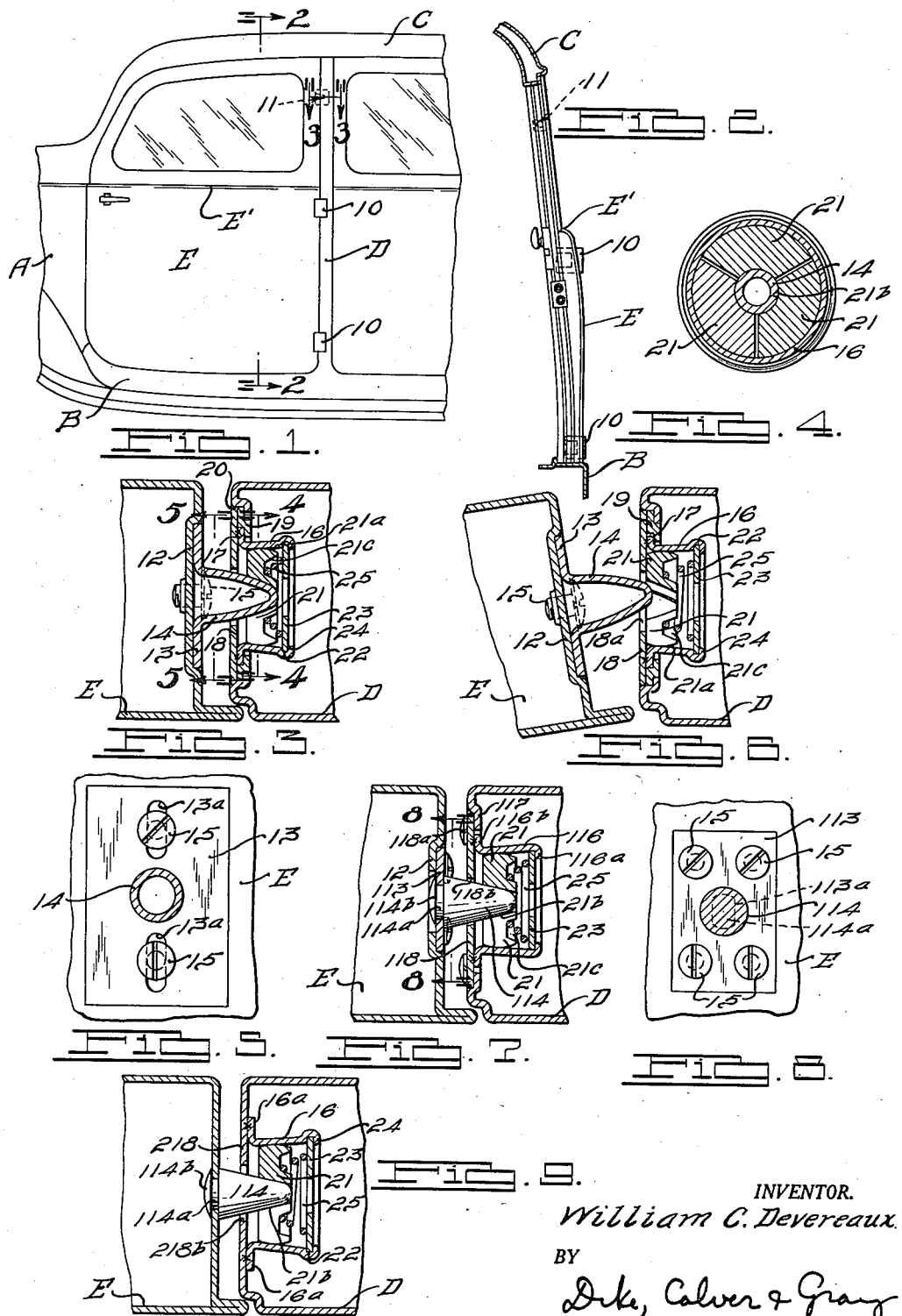
INVENTOR.
William C. Devereaux.
BY
Dike, Calver & Gray
ATTORNEYS.

Patented July 7, 1936

2,046,612

UNITED STATES PATENT OFFICE 2,046,612

DOVETAIL

William C. Devereaux, Detroit, Mich.

Application January 28, 1935, Serial No. 3,715

10 Claims. (Cl. 16—85)

This invention relates to door dovetails particularly, although not exclusively, adapted for use in connection with doors of automobile or other vehicle bodies, an object of the invention being to provide an improved device of this type having cooperating parts adapted to be mounted on the door and body pillar or other frame member, said parts functioning in improved and effective manner to produce a supporting connection between the door and pillar of substantially rigid and inflexible nature.

A further object of the invention is to provide an improved dovetail which may be mounted on the door and body pillars of a vehicle body adjacent the hinged edges thereof and composed of coacting male and female parts which, when situated on the opposed jamb faces of the pillars, may be utilized not only to prevent vibration and rattling of the door but also to supplant one of the conventional hinge supporting members for the door.

Another object is to provide improved means which is inconspicuous when the door is open and completely hidden when closed and which permits the hinging or supporting of a door of the curved or inwardly sloping type without the necessity of employing the unsightly top or upper hinge now in use on bodies of this character.

A further object is to provide an improved dovetail which is efficient in operation, of relatively simple construction, and one which is capable of being manufactured at relatively low cost.

Other objects of the invention will appear in the following description and appended claims when considered in connection with the accompanying drawing forming a part of this specification.

In said drawing:

Fig. 1 is a fragmentary side elevation of an automobile body illustrating the invention applied thereto.

Fig. 2 is a vertical section taken substantially along the line 2—2 of Fig. 1.

Fig. 3 is a horizontal section taken substantially along the line 3—3 of Fig. 1.

Fig. 4 is a section taken substantially along the line 4—4 of Fig. 3 in the direction of the arrows.

Fig. 5 is an elevation, partly in section, taken substantially along the line 5—5 of Fig. 3 in the direction of the arrows.

Fig. 6 is a section corresponding to Fig. 3 with the door partly open.

Fig. 7 is a view similar to Fig. 3 showing a modified form of the invention.

Fig. 8 is an elevational view, partly in section, taken substantially along the line 8—8 of Fig. 7; and Fig. 9 is a view similar to Figs. 3 and 7, showing a further modified form of the invention.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

As is well known, modern streamlined enclosed automobile bodies are often provided with doors and door pillars which slope or are inclined upwardly and inwardly from the body sill toward the roof unit, thus producing a decided curvature or inward sweep in the region of the upper section of the door and its supporting pillar. In these bodies it is often necessary to employ a top hinge construction of sufficient size and length to permit swinging of the door, since the pivotal point of this hinge must be vertically alined with the pivotal point or points of the hinge or hinges for supporting the lower section of the door. Obviously, such hinges are unsightly and detract from the appearance of the car, in addition to providing an objectionable projection which extends a substantial distance beyond the side wall of the body. By virtue of the present invention the foregoing objections have been overcome and an improved dovetail provided by which the upper section or portion of a curved or inwardly sloping door may be rigidly supported when closed to prevent rattling and jarring due to vibrations set up when the vehicle is in motion.

In the accompanying drawing I have shown, merely by way of example, several modifications of a dovetail construction embodying the invention and shown in position for supporting the upper section of an automobile door. Referring particularly to Figs. 1 and 2 there is shown as a whole at A an automobile body having a sill B, a roof structure or rail C, a body pillar D and a front door E. The lower section of the door below the belt panel E' is pivotally supported for swinging movement relative to the pillar D by means of conventional hinges 10, the upper section of the door, that is, that portion thereof which is above the belt panel E', being supported when in closed position by the improved dovetail construction of the present invention which is shown as a whole at 11.

Referring now particularly to Figs. 3 to 6 inclusive, there is shown one form of my improved dovetail construction. In this form the upper section or portion of the pillar of the door E is provided in its inner edge or jamb face with a depression 12 which may be pressed into the pillar. This depression 12 is adapted to receive and support a removable plate 13 providing the base or supporting portion of a preferably conical wedge-shaped stud or projection 14 forming the male member of the dovetail. The plate or base is provided with a pair of spaced elongated openings or slots 13a which receive cap screws 15 which are threaded into the metal of the depressed portion to secure the plate and stud in position, the slots and screws providing means permitting vertical adjustment of the member relative to the face of the door jamb so as to accommodate itself to the female socket member of the dovetail carried by the pillar D.

Referring now to the cooperating female member or socket portion of the dovetail, there is provided a preferably cylindrical housing or casing 16 having an outer marginal flange 17 which, as shown, may be secured in place between a face or closure plate 18 provided with a central opening 18a and one flange of a ring-like member 19 which, as shown, is substantially Z-shaped in cross section. The parts 17, 18, and 19 are assembled and are secured in place within a recess or depression 20 formed in the edge or jamb face of the pillar D in any suitable manner, such as by spot welding. Located within the housing or casing 16 is a series of preferably three segmental members 21 having their peripheral edge portions preferably curved or rounded to provide convex surfaces 21a which contact the side walls of the housing. The inner end portion of the housing is stamped or shaped to provide an annular recess or groove 22 to receive and support a perforated disc or washer 23 which is held in place in the groove by an inwardly extending annular flange 24 formed on the housing. The three segmental blocks or members 21 together provide a socket portion 21b which, as shown, is substantially conical to accommodate the stud or male member 14. The outer face of each segment is recessed or cut away at 21c and when assembled, the recesses provide a substantially continuous annular groove to receive and support one end of a coil spring 25. The opposite end of the spring engages the inner face of the washer 23. As seen in Fig. 6, the spring 25 engages all of the segmental members 21 simultaneously and serves the dual function of maintaining these members together as a unit and of normally maintaining them against the forward wall or plate 18 of the housing or casing. The spring is formed of any desired gauge of wire and is of sufficient strength to cause the blocks 21 to exert a sufficient force or pressure upon the stud or member 14 to resist its movement into the socket 21b when the door is swung into closed position. The spring also maintains the parts against relative movement and consequent rattling or jarring when they assume the positions in which they are shown in Fig. 3. However, the blocks are capable of a limited rocking or oscillating movement when the stud moves into or out of engagement with them, to accommodate themselves to the shape and position of the stud. It will be understood that the several parts or elements just described which together form the socket or female portion of the dovetail construction, may be assembled in any suitable and convenient manner.

In Figs. 7 and 8 there is shown a modified form of dovetail construction embodying the invention. In these figures the edge or jamb of the door E is provided in its upper section with a depressed portion or recess 12 corresponding to the depression shown in the previous figures and adapted to receive and support a removable plate 113 to which is fastened a male stud member 114. This member, as shown is substantially conical and has a reduced neck portion or shank 114a which is passed through an opening 113a formed in the plate, the outer end of the neck portion being riveted over at 114b to secure the stud member to the plate. As in the previous form of the invention, the plate 113 is adjustably secured in position in the recess or depression by a plurality of cap screws or the like 15.

The body pillar D in the present form of the invention has its jamb face or edge formed to provide an apertured recess or depressed portion 117 to receive and support a removable metal plate 118. The plate carries on its inner face a casing or housing portion 116, the latter having at its inner end an inturned marginal flange portion or lip 116a which is adapted to receive and support an apertured disc or washer 23. The plate 118 and washer provide the end walls of the casing. The outer end of the housing has a surrounding flange 116b by which the housing is attached to the plate 118, this being accomplished by means of spot-welding (Fig. 7) or in any other suitable manner. The casing is adapted to receive a spring 25 and a series of segmental blocks or members 21 which, when assembled, provide, as shown, a tapered socket portion 21b adapted to receive the conical stud or male member 114 of the dovetail. It will be seen that the parts are arranged in substantially the same manner as in the preceding figures and are maintained within the casing against displacement by means of the plate 118 which fits within the depression 117 and is held in place therein by screws or the like 118a. The plate 118 is centrally apertured at 118b to permit the stud member to pass therethrough when the door is closed. As in the preceding form of the invention, the spring 25, which has its opposite ends in engagement with the recessed inner face of the segmental members 21 and the plate or washer 23, serves to maintain the segments together. The spring is of sufficient strength to force the segments, as a unit, toward the closure plate 118, yet permitting limited relative rocking movement of the several blocks or segments. When the door is closed, as shown, the spring causes the segments to tightly grip the stud member of the dovetail and hold the parts together to prevent any possibility of rattling or jarring due to vibrations set up when the vehicle is in motion.

In Fig. 9 there is shown a further modified form of dovetail construction embodying the present invention. In this form, the jamb of the door E is provided with an opening which is adapted to receive the neck portion 114a of a substantially conical stud or male member 114 which, as shown, corresponds to the member 114 shown in Figs. 7 and 8. The stud is inserted in the opening and the end of the reduced neck portion or shank thereof is flattened or riveted over at 114b to secure the stud rigidly in place. The jamb face 218 of the pillar D is apertured at 218b to permit the passage therethrough of the stud member 114 when the door is closed. The socket or female portion of the dovetail construction comprises a preferably round metal housing or casing 16 having a marginal flange 16a which, as shown, is secured to the inner face of the jamb 218 by spot welding. The inner or free end of the casing is shaped to provide an annular recess or groove 22 corresponding to the recess 22 shown in Figs. 3 and 6, for the purpose of receiving and supporting an apertured disc or washer 23 which is held in place within the groove by the inturned flange 24. In the present instance, the jamb face 218 provides the front closure or wall of the casing or housing. As in the preceding forms, the housing contains a plurality of segmental members or blocks 21, which together provide a tapered socket portion 21b to receive the stud 114, there being a coiled spring 25 interposed between the blocks and the washer 23 to hold the segments together and to force them toward the jamb face 218 for the same purpose as the corresponding springs shown in preceding figures.

I claim:

1. A dovetail member for a vehicle door comprising, in combination, a housing, a plurality of segmental members mounted in said housing for sliding and rocking movements therein relative to the movement of a door with which it is to be used, said members together providing a socket having a tapered conical recess, and a compression spring engaging said members for yieldingly maintaining them together as a unit and for urging them toward an end wall of said housing.

2. A dovetail member for a vehicle door comprising, in combination, a housing, a plurality of segmental members mounted in said housing for sliding and rocking movements therein relative to the movement of a door with which it is to be used, said members together providing a socket having a tapered conical recess, and a compression spring engaging said members for yieldingly maintaining them together as a unit and for urging them in a direction co-planar with the vehicle door when closed.

3. A dovetail member for a vehicle door comprising, in combination, a housing, a plurality of segmental members mounted in said housing for sliding and rocking movements therein relative to the movement of a door with which it is to be used, said members together providing a socket having a tapered conical recess, said door having a projection adapted to engage said socket, and a compression spring for maintaining the segmental members in engagement with one another when the door is open.

4. A dovetail member for a vehicle door comprising, in combination, a housing, a plurality of segmental members mounted in said housing for sliding and rocking movements therein relative to the movement of a door with which it is to be used, said members together providing a socket having a tapered conical recess, said door having a conical projection adapted to engage said socket, and a compression spring for maintaining the segmental members in engagement with one another when the door is open.

5. A dovetail comprising a housing adapted to be carried by a door frame, a plurality of segmental blocks together providing a socket member mounted for sliding movement in said housing and having a central recess, said blocks having a common spring receiving recess formed therein, a stud member adapted to be carried by a door and adapted to enter said socket when the door is closed, and a compression spring engaging the recess in said blocks and yieldingly maintaining them as a unit in engagement with said stud member.

6. A dovetail comprising a housing adapted to be carried by a door frame, a plurality of segmental blocks together providing a socket member mounted for sliding movement in said housing and having a central recess, a stud member adapted to be carried by a door and adapted to enter said socket when the door is closed, and a compression spring engaging said blocks and yieldingly maintaining them as a unit in engagement with said stud member, said spring permitting limited relative rocking movement of said blocks during the initial engagement or disengagement thereof by said stud.

7. A dovetail for a vehicle door and door frame, comprising a housing adapted to be carried by said door frame, a series of segmental resiliently supported members substantially abutting when in normal positions and together providing a socket having a central recess located in said housing and adapted for limited movement as a unit therein, and an adjustable substantially conical projecting member carried by said door and adapted to engage said recess when the door is closed.

8. A door dovetail including male and female members, the male member comprising a wedge-shaped projection and the female member comprising segmental blocks substantially abutting when in normal positions and forming a central wedge-shaped recess, and a single coil spring common to said blocks.

9. A dovetail for connecting door and body pillars at the hinged edge of the door, comprising a wedge-shaped male member projecting from the jamb of the door pillar in the direction of its plane, and a female member mounted in a recess in the jamb face of the body pillar, said female member comprising a plurality of spring supported segmental blocks forming a central recess having its major axis lying in the plane of the door when closed.

10. A dovetail for connecting door and body pillars at the hinged edge of the door, comprising a wedge-shaped male member projecting from the jamb face of one of said pillars, and a female member mounted in a recess in the jamb face of the other pillar, said female member comprising a plurality of yieldable blocks forming a central recess having its major axis lying in the plane of the door and in line with said male member when the door is closed.

WILLIAM C. DEVEREAUX.